US009633440B2

United States Patent
Holtzman

(10) Patent No.: US 9,633,440 B2
(45) Date of Patent: Apr. 25, 2017

(54) SYSTEM FOR LOCATING MOBILE DISPLAY DEVICES

(71) Applicant: Raphael Holtzman, San Mateo, CA (US)

(72) Inventor: Raphael Holtzman, San Mateo, CA (US)

(*) Notice: Subject to any disclaimer, the term of this patent is extended or adjusted under 35 U.S.C. 154(b) by 0 days.

(21) Appl. No.: 14/525,153

(22) Filed: Oct. 27, 2014

(65) Prior Publication Data
US 2015/0117710 A1   Apr. 30, 2015

Related U.S. Application Data

(60) Provisional application No. 61/896,268, filed on Oct. 28, 2013.

(51) Int. Cl.
*G06K 9/00* (2006.01)
*G06T 7/00* (2017.01)

(52) U.S. Cl.
CPC .......... *G06T 7/0065* (2013.01); *G06T 7/0042* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

| 8,447,070 | B1* | 5/2013 | Bozarth | H04N 7/18 382/103 |
| 8,634,848 | B1* | 1/2014 | Bozarth | H04W 64/00 455/41.2 |
| 8,683,054 | B1* | 3/2014 | Karakotsios | H04N 5/23222 348/47 |
| 8,947,349 | B1* | 2/2015 | Hart | G09G 3/002 345/156 |
| 2006/0040712 | A1* | 2/2006 | Ansari | G06F 3/0317 455/566 |
| 2006/0089134 | A1* | 4/2006 | Moton | H04L 41/12 455/418 |

(Continued)

*Primary Examiner* — Shervin Nakhjavan

(57) ABSTRACT

A system is provided in which a mobile display device, such as a cellular phone, a computing tablet, a mobile computer or any other portable device that incorporates a computing element and a display element, is adapted to display a predetermined pattern. The pattern can be either visible or invisible to human eye. An image sensor (most likely, but not necessarily, an optical one) detects said pattern, and the location of the MDD is determined in relation to the sensor. In one embodiment, the MDD displays a pattern on the device's standard display, for example four points of unique character, such as color or blinking pattern. Such a method will allow a cost-effective way to implement the system, as it requires no additional cost in hardware. In another embodiment, the system recognizes the display unit of the MDD (instead of a specific pattern on the MDD's display) and can determine location of the MDD without any change to the MDD's hardware or software. In yet another embodiment, the system includes bi-directional wireless communication between the receiver and the MDD and software that allows the MDD to exchange information with the system, such as the exact dimensions of the display.

10 Claims, 13 Drawing Sheets

(56) References Cited

U.S. PATENT DOCUMENTS

| | | | | |
|---|---|---|---|---|
| 2009/0254855 A1* | 10/2009 | Kretz | .................... | G06F 1/1626 |
| | | | | 715/800 |
| 2012/0017236 A1* | 1/2012 | Stafford | .................. | A63F 13/00 |
| | | | | 725/32 |
| 2012/0050479 A1* | 3/2012 | Karaoguz | .......... | H04N 13/0011 |
| | | | | 348/46 |
| 2013/0076894 A1* | 3/2013 | Osman | .................... | H04W 4/02 |
| | | | | 348/135 |
| 2014/0152809 A1* | 6/2014 | Jarvis | ........................ | H04N 7/18 |
| | | | | 348/135 |
| 2014/0247279 A1* | 9/2014 | Nicholas | ................. | G06F 3/011 |
| | | | | 345/633 |
| 2014/0320674 A1* | 10/2014 | Kuang | ............... | H04N 5/23222 |
| | | | | 348/207.1 |
| 2014/0368670 A1* | 12/2014 | Morley | .............. | H04N 5/23229 |
| | | | | 348/207.1 |
| 2015/0049959 A1* | 2/2015 | Johnson | ............ | G06F 17/30268 |
| | | | | 382/305 |
| 2015/0163766 A1* | 6/2015 | Weiss | .................. | H04W 64/006 |
| | | | | 455/456.1 |

* cited by examiner

SYSTEM FOR LOCATING MOBILE DISPLAY DEVICES

CROSS-REFERENCE TO RELATED APPLICATIONS

U.S. Provisional Application No. 61/896,268. Filed by Raphael Holtzman on 28 Oct. 2013.

STATEMENT REGARDING FEDERALLY-SPONSORED RESEARCH

Not applicable.

REFERENCE TO SEQUENCE LISTING, A TABLE OR A COMPUTER PROGRAM LISTING COMPACT DISC

Not applicable

BACKGROUND OF INVENTION

The ability to find the locations of multiple mobile devices (such as cellular phones, computing tablets, mobile computers or any other portable devices that incorporate a computing element and a powered display element) is an essential requirement for location-based activity in a setting such as a classroom or a boardroom. Location-based activities are a component of many computer activities designed to perform a pre-defined action when the mobile display device ("MDD") arrives at, stays for a time or leaves a specific location. For example, if a student with an MDD walked up to the classroom's whiteboard, the information on that student's MDD would be displayed automatically on the board's main video screen for the entire class.

Current solutions for determining location of MDDs indoors either provide insufficient accuracy for location-based services appropriate for classroom or workspace requirements or require the installation of many sensors/transmitters within the room which may be cost prohibitive.

BRIEF SUMMARY OF THE INVENTION

In preferred embodiments, the present invention employs a continuously active tracking system to track the location and determine orientation of a single or multiple mobile display devices (MDDs), such as a cellular phone, a computing tablet, a mobile computer or any other portable device that incorporates a computing element and a powered display element. For the remainder of this document, the term "mobile display device" or "MDD" will refer to any portable device that incorporates a computing element such as a computer processor and a powered display element. In some aspects, the invention can provide two- or three-dimensional location and orientation data in a known space, such as classrooms, meeting rooms, control centers, etc. Various embodiments are disclosed that allow the construction of a system at a relatively low cost for a wide variety of environments and applications. An object in 3-D has 6 degrees of freedom: X, Y, Z, roll, pitch, and yaw. For the purposes of this document, "location" is defined as the (x, y, z) position of an object, and "orientation" is defined as an object's yaw, pitch, and roll angular position.

The invention can employ most conventional triangulation techniques to continuously track the location and orientation of an MDD. While many such techniques are known, these techniques traditionally have required specialized or dedicated systems. The invention takes advantage of the improvements in both modern tracking and display technologies to simplify the system and reduce cost.

Moreover, by embedding a pattern in the display, for example through blinking or color, the invention provides the ability to communicate data that can be used in a variety of ways to increase efficiency and provide better accuracy to the system. Each MDD can display a different pattern, thus giving the system the ability to distinguish between devices and to use the pattern to improve the extraction process by comparing the image sensor data to the known pattern. Some examples of other system improvements that are possible with this approach may include, but are not limited to: allowing for capabilities that are available or unavailable in specific models of MDDs and giving a specific MDD the ability to control another display or system in a room when it is located in a particular part of the room.

DETAILED DESCRIPTION OF THE INVENTION

In preferred embodiments, the present invention comprises computer implemented methods, devices, and systems configured to provide a continuously active tracking system to track the location and determine the orientation of a single or multiple mobile display devices (MDDs), such as a cellular phone, a computing tablet, a mobile computer, a wearable computer, or any other portable device that incorporates a computing element and a powered display element. The system can provide two- or three-dimensional location and orientation data in classrooms, meeting rooms, control centers, etc. Various embodiments are disclosed herein that allow the construction of a system at a relatively low cost for a wide variety of environments and applications. An object in 3-D has 6 degrees of freedom: X, Y, Z, roll, pitch, and yaw. For the purposes of this document, "location" is defined as the (x, y, z) position of an object, and "orientation" is defined as an object's yaw, pitch, and roll angular position.

The invention can employ most triangulation techniques to continuously track the location and orientation of an MDD. While many such techniques are known, these techniques traditionally have required specialized or dedicated systems. The invention takes advantage of the improvements in both modern tracking and display technologies to simplify the system and reduce cost.

Moreover, by embedding or generating a pattern in the display of the mobile display device, for example through blinking or color, the invention provides the ability to communicate data that can be used in variety of ways to increase the efficiency and accuracy of the system. For example, each MDD can display a different pattern on its display screen, thus giving the system the ability to distinguish between devices and to use the pattern to improve the data extraction process by comparing the data received from the image sensor 1030 to the known pattern displayed on the display screen of the MDD. As used herein, the term image sensor shall generally mean a camera or other device configured to capture visual images from a location. Some examples of other system improvements that are possible with this approach may include, but are not limited to: allowing for capabilities that are available or unavailable in specific models of MDDs and giving a specific MDD the ability to control another display or system in a room when it is located in a particular part of the room. The system potentially could use the MDD's internal sensors, such as a gyroscope, accelerometer, or a motion detector, together with other data to increase accuracy and robustness. For example, the system could verify if an MDD changed location by checking the MDD's motion detector (i.e. a sensor within the MDD could transmit this data to a server for processing).

Figure 1:
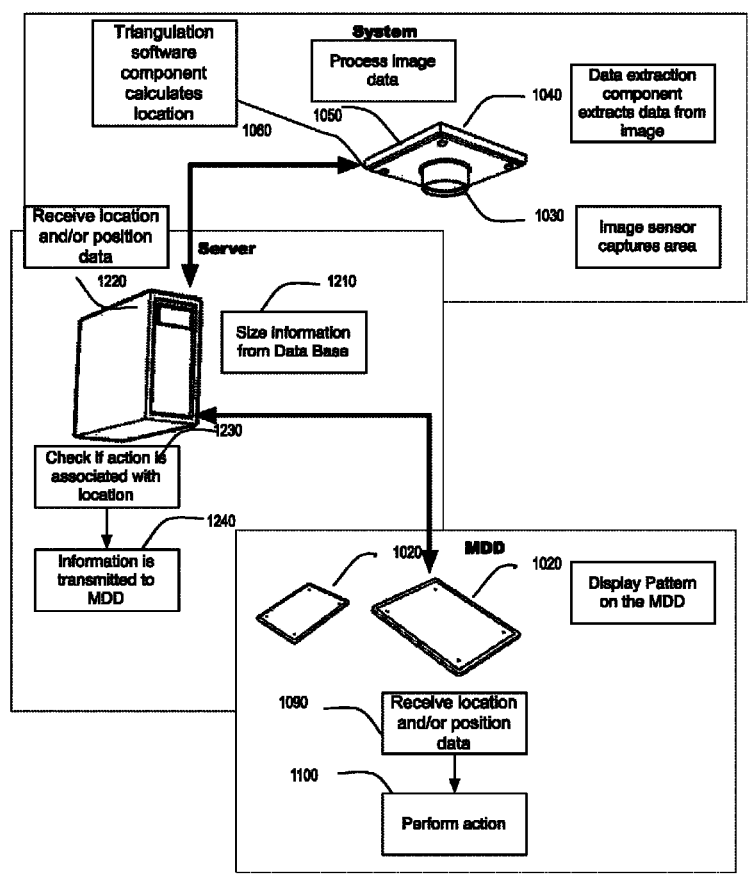
FIG. 1 is a diagram showing an example of a camera-based embodiment of the system with a server.
Figure 2:
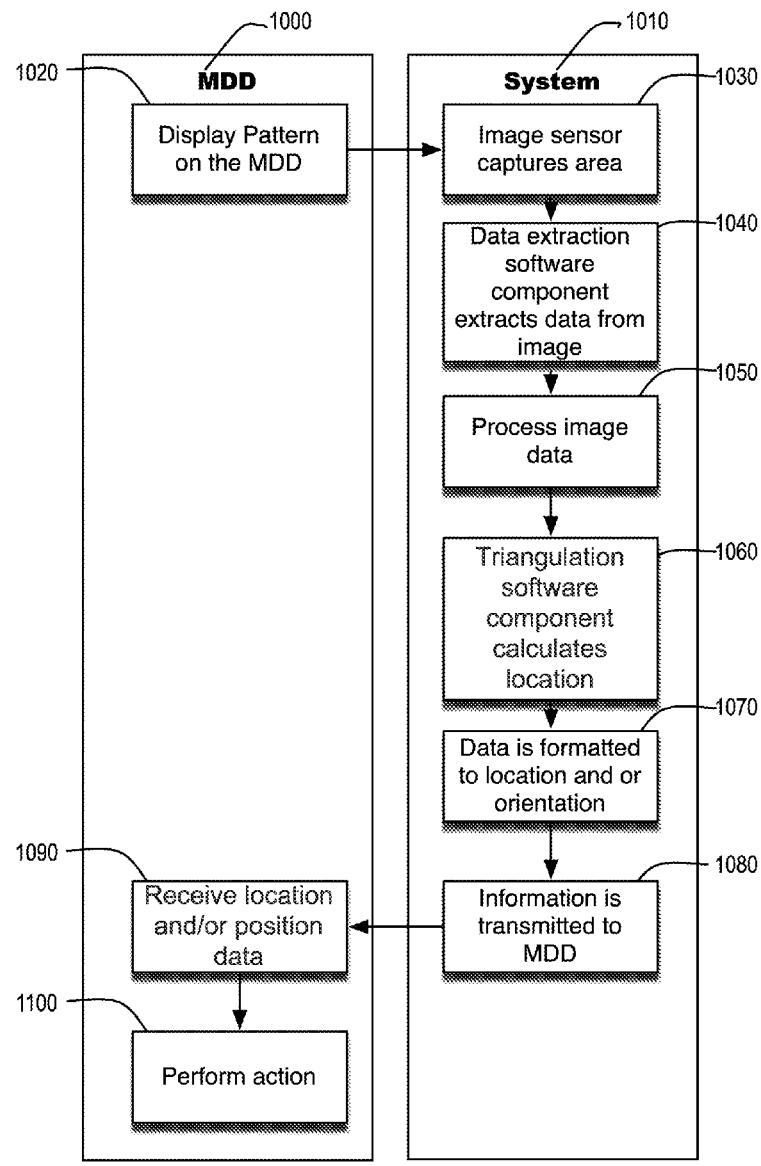
FIG. 2 shows an example of some computer implemented methods of the system for the camera-based embodiment.
Figure 12:
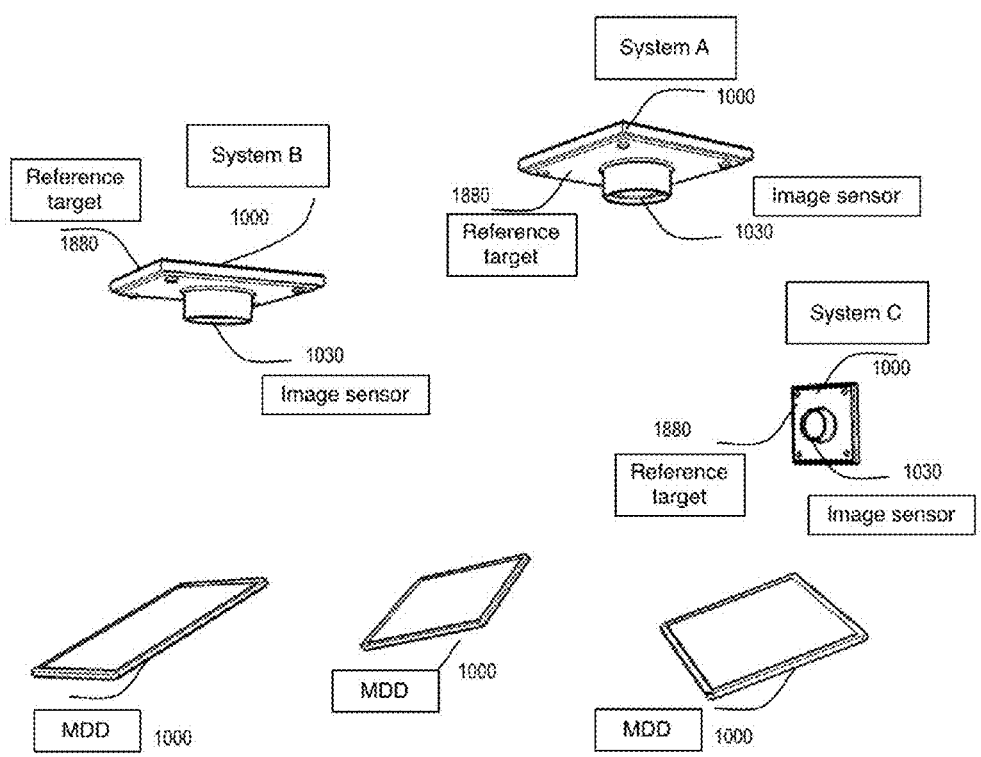
FIG. 12 is a perspective view of a possible embodiment of three sensor units (System A, System B, and System C) working together to cover an area. Systems A and B are preferably ceiling-mounted, while System C is preferably wall-mounted.

A first embodiment of the system as shown by example in FIG. 2 is one that is suited for use in indoor settings, such as classrooms, conference rooms, co-working spaces, or control rooms. In this embodiment, either the MDD 1000 is loaded with software (such as an application or "app) that generates the unique pattern 1020 (or other image or indicia capable of being recognized by an image sensor) on its standard display screen or the MDD hardware is modified to display said pattern, for example by adding LED or other lighted elements. Each MDD can display a different pattern, thus giving the system the ability to distinguish between devices and to use the pattern to improve the data extraction process by comparing the data received from the image sensor 1030 to the known pattern. This comparison process may be performed by a processor or rules engine running on a computer, such as a server. There are many suitable image recognition and image comparison programs known in the art which would be suitable for this application. The specific pattern can communicate information about the actual physical size of the MDD and/or other details about the product specifications of the MDD because this information may be stored by the system (for example in a database). In this embodiment, a single MDD or multiple MDDs can be tracked. As shown in FIG. 1, in this example the system incorporates a single image sensor 1030 or multiple image sensors positioned in such a way as to provide continuous coverage of the activity area, as shown by example in FIG. 12. The image sensor(s) send(s) data received from the sensor to the data extraction software component 1040 of the system. The data extraction software component of the system extracts the image data received from the sensor 1030 for the MDD display(s), including the MDD size(s) relative to the overall image capture area, and the MDD-generated unique pattern(s). The system also potentially can use the MDDs internal sensors, such as a gyroscope or a motion detector, together with other data to increase accuracy and robustness. For example, the system could verify if an MDD changed location by checking the MDD's motion detector. The extracted data are sent to the triangulation software component 1060 of the system, where triangulation techniques are used to compare the extracted image data with data about the actual size of the MDD to track the location and orientation of each MDD. As used herein, the term "processing portion" shall generally mean a computer processor or rules engine configured to run software encoding methods and processes of the system. Once the location(s) and orientation(s) are known, a data transmission module of the system may be used to communicate the location and/or orientation information back to the MDDs.

In some embodiments, the system further comprises a server portion 1200. In this embodiment, the server can be connected to other components of the system, such as sensors and MDDs, either by wire or through a wireless network. The server can reside locally, remotely, or as part of an external service. The server portion is loaded with software that provides services and communication between the triangulation software component and the MDD. A database 1210 on the server can contain certain information about the MDD characteristics, such as specific model information and exact display size, brightness, color, etc. The server can issue instructions to each MDD to display a pattern that is unique to each device, thus giving the system the ability to distinguish between MDDs and to use the patterns to improve the extraction process by comparing the image sensor 1030 to the known patterns on the server. This information, when provided to the processing part while calculating the location information, can greatly enhance the system efficiency and accuracy. As shown by example in FIG. 3, the system incorporates a single image sensor 1030 or multiple image sensors positioned in such a way as to provide viewing and continuous coverage of the activity area (e.g. the classroom, conference room, etc.). The image sensor(s) send(s) data to the data extraction software component 1040 of the system. The data extraction software component of the system receives and extracts the image data for the MDD display(s), including the MDD size(s) relative to the overall image capture area, and the MDD-generated unique pattern(s). The extracted data are sent to the triangulation software component 1060 of the system, where triangulation techniques are used to compare the extracted image data with data about the actual size of the MDD to track the location and orientation of each MDD. The triangulation software component can query the server database for specific information about the MDD to increase the efficiency and/or accuracy of the calculations. Once the location and/or orientation information is known, the data are communicated to the server. At the server, the software checks if any location-based activity is associated with the combination of the device and this particular location (or particular location and orientation) and communicates the new instruction to the relevant MDD, as needed. Some of this information may cause the MDD to change the display pattern, for example, to improve system performance. As used herein, the term "location-based activity" refers to any action that is triggered by an MDD entering into, leaving from, or remaining in a particular location.

Figure 6:
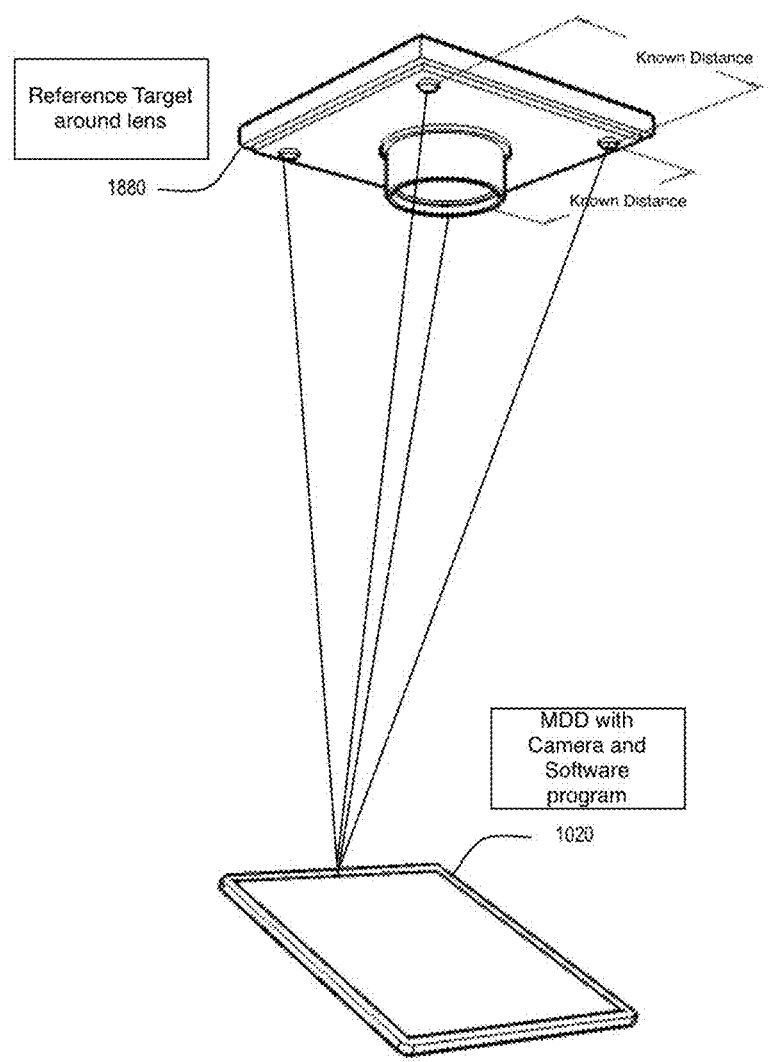
FIG. 6 is a perspective view of the MDD-based system capturing the reference target in accordance with various embodiments described herein.
Figure 7A:
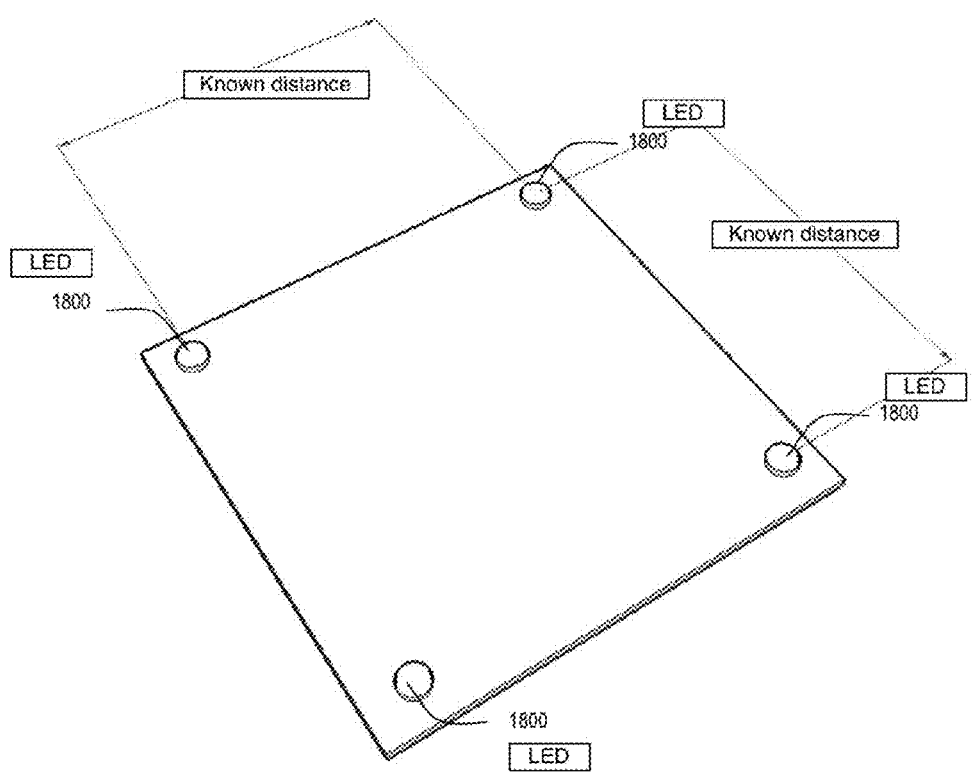
FIG. 7A is a perspective view of a possible reference target.
Figure 8:
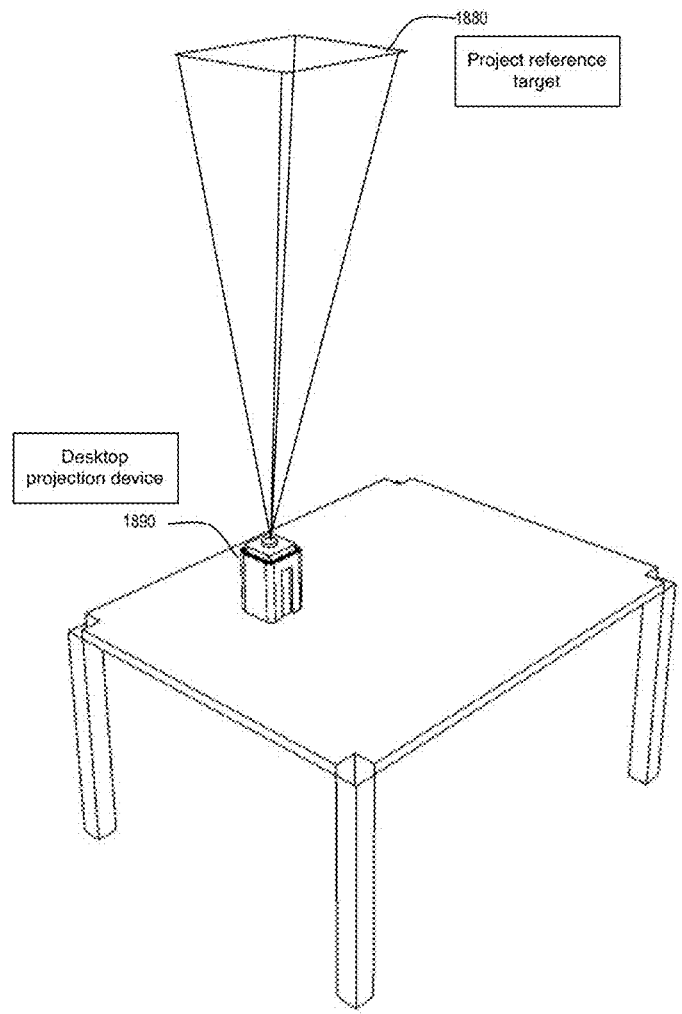
FIG. 8 illustrates a possible embodiment of a desktop device projecting a reference target on the ceiling of the active area.

In some embodiments, the system is further configured to operate with MDDs that have an integrated camera. Many MDDs use such a camera as part of a solution for video calling or video conferencing. In this embodiment, as shown in FIG. 6, a reference target, such as a printed graphic, a pattern of any spectrum of light, or a laser spot, is installed or projected on the ceiling or other suitable location. There are many different options for constructing the reference target, including but not limited to: (a) An array of multiple LED lights arranged in a known size and shape, such as rectangle, is included as example of a possible reference target in FIG. 7A; and (b) a reference target, as shown in FIG. 8, could be created by a small desktop device projecting an array of light dots arranged in a known size and shape, such as rectangle, by using a laser producing light that is visible or invisible to the human eye. Such a device, as shown in FIG. 8, can also provide a convenient location for the processing portion of the system, as well as outputs for external connections. A software program, which is preferably configured to run on the MDD, uses the MDD's built-in camera to capture image data that include a reference target, as described above. The size and distance information is then extracted from the image and compared to the known real size of the reference target, producing the position and orientation of the MDD in relation to the reference target. In some embodiments, the system also can use special software to map the ceiling area and use the current layout or parts of it as the reference target. In some further embodiments, the system can use the MDDs' internal sensors, such as a gyroscope or a motion detector, together with other data to increase accuracy and robustness. For example, the system could verify if an MDD changed location by checking the MDD's motion detector. This information, either on the MDD itself or shared on the network with a server and other devices, then could be used in conjunction with any location-based activity. This embodiment can be constructed with a server (such as in the second embodiment above) or without a server (such as in the first embodiment).

In some embodiments, the present invention combines the system in the second embodiment with the system described in the third embodiment as described herein to increase efficiency and accuracy by providing the best features of each embodiment. The system incorporates a single image sensor or multiple image sensors positioned to provide continuous coverage of the activity area and to output a signal to the extraction software component of the system.

Figure 7:
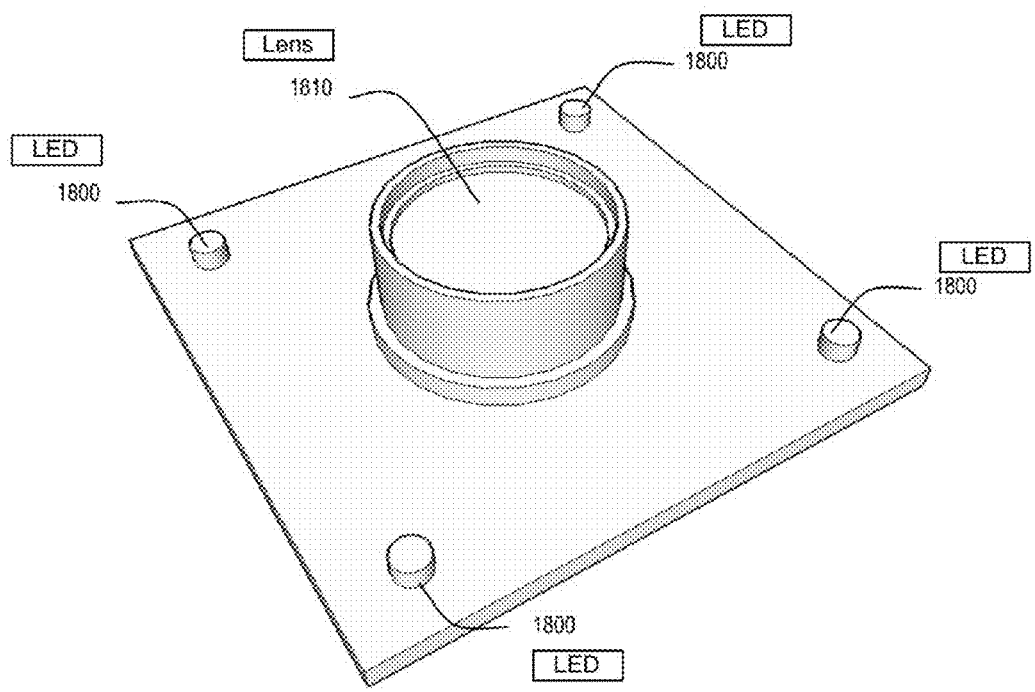
FIG. 7 is a perspective view of an example of housing for the sensor and reference target in accordance with various embodiments described herein.

As shown by example in FIG. 7, a sensor and reference device or reference target combines the housing for the image sensor with the creation of the reference target for the third embodiment. There are many different options for constructing the reference target, including but not limited to: (a) an array of multiple LED lights arranged in a known size and shape, such as rectangle, is included as example of a possible reference target in FIG. 7 and (b) a reference target, as shown in FIG. 8, could be created by a small desktop device projecting an array of light dots arranged in a known size and shape, such as rectangle, by using a laser producing light that is visible or invisible to the human eye.

Figure 3:
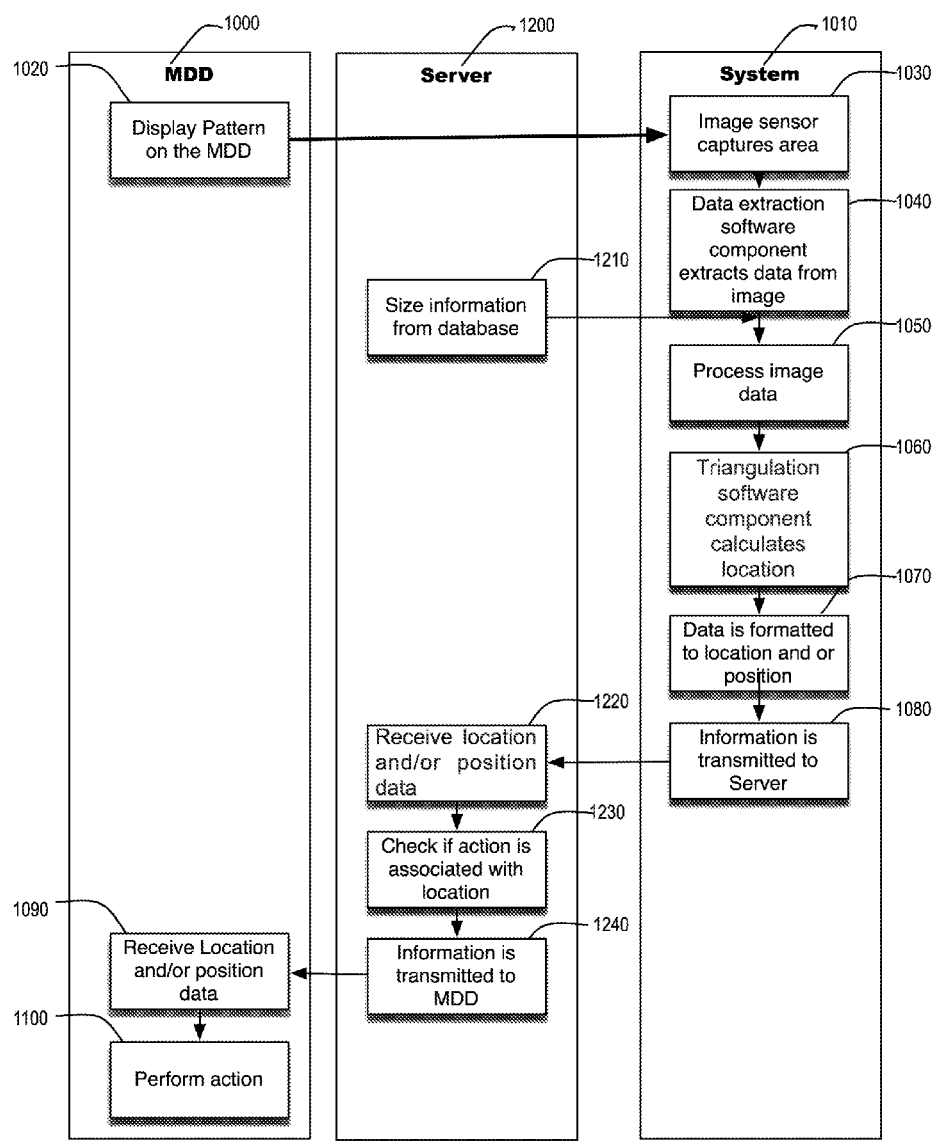
FIG. 3 shows an example of some computer implemented methods of the system for the camera-based embodiment that includes a server.
Figure 4:
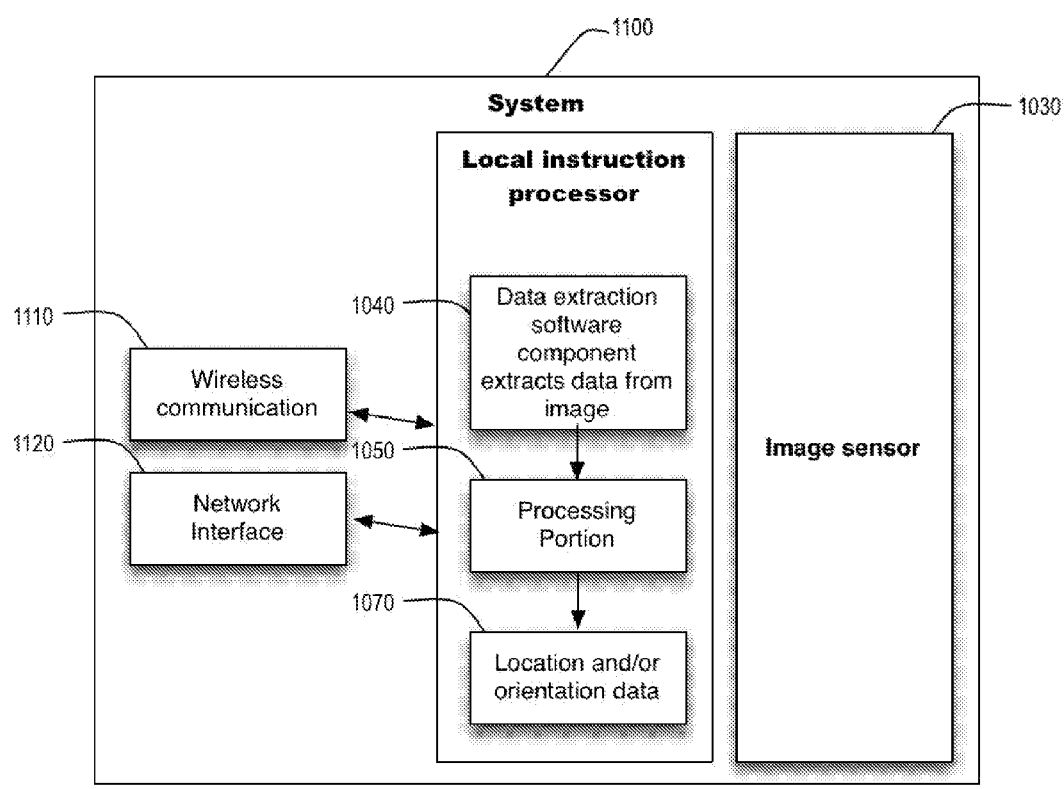
FIG. 4 is a block diagram showing an example of some of the system components as described in various embodiments herein.
Figure 5:
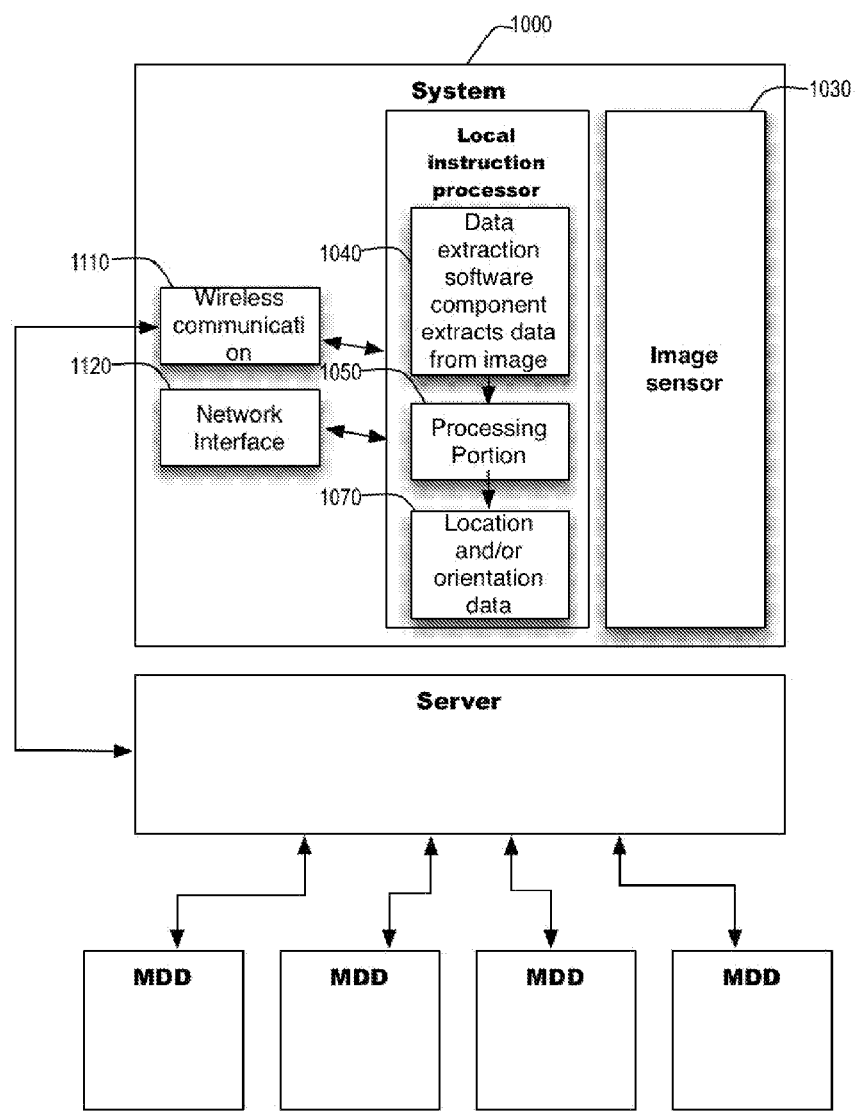
FIG. 5 is a block diagram showing an example of some of the system components with a server as described in various embodiments herein.

As shown in FIG. 3, the system incorporates a single image sensor 1030 or multiple image sensors positioned in such a way as to provide continuous coverage of the activity area. The image sensor(s) send(s) data to the data extraction software component 1040 of the system. The data extraction software component of the system extracts the image data for the MDD display(s), including the MDD size(s) relative to the overall image capture area, and the MDD-generated unique pattern(s). The extracted data are sent to the triangulation software component 1060 of the system, where triangulation techniques are used to compare the extracted image data with data about the actual size of the MDD to track the location and orientation of each MDD. The triangulation software component can query the server database for specific information about the MDD to increase the efficiency and/or accuracy of the calculations. Once the location and/or orientation information is known, the data are communicated to the server. At the server, the software checks if any location-based activity is associated with the combination of the device and this particular location (or particular location and orientation) and communicates the new instruction to the relevant MDD, as needed. Some of this information may cause the MDD to change the display pattern, for example, to improve system performance.

Figure 9:
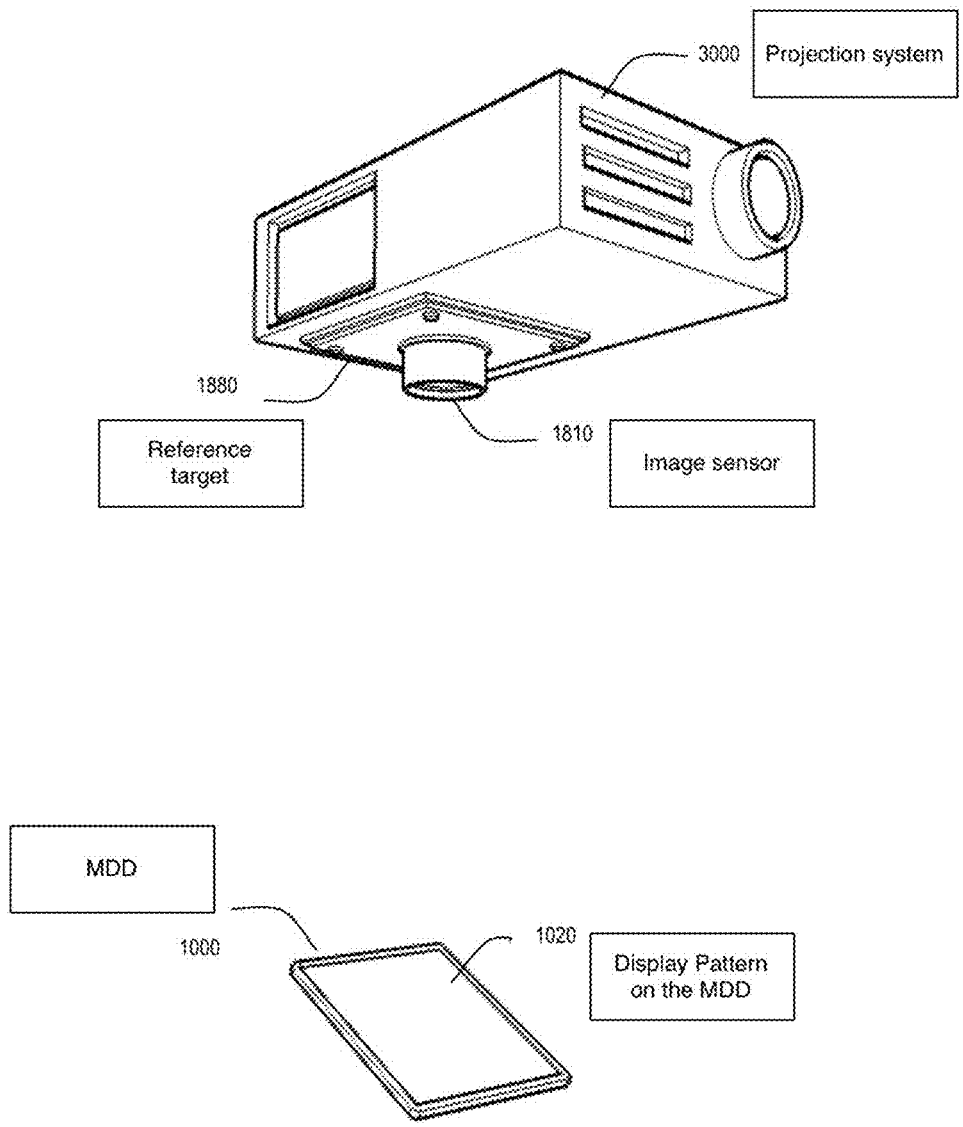
FIG. 9 is a perspective view showing a possible embodiment of the sensor built into a projector.

In some alternative embodiments, a system is presented that is suited for use in locations where it is not practical or secure to allow users to load specific software (apps) on their MDDs. In this embodiment, the MDD is not loaded with any software that generates the unique pattern on its display nor is its hardware modified to display said pattern. Instead, the recognition is based on detecting the normal display screen as a whole, rather than any specific pattern. Here, the system preferably does not depend on any changes or modifications to the MDD and requires only the image capture and processing to identify location and positioning. The system incorporates a single image sensor or multiple image sensors positioned in such a way as to provide continuous coverage of the activity area. The image sensor(s) send(s) data to the data extraction software component of the system. The data extraction software component of the system extracts the image data for the MDD display(s), including the MDD size(s) relative to the overall image capture area and the perceived shape of the display. The extracted data are sent to the triangulation software component of the system, where triangulation techniques are used to compare the extracted image data with data about the actual size of the MDD to track the location and orientation of each MDD. Once the location(s) and orientation(s) are known, another segment of the system communicates the location and/or orientation information back to the MDDs In a further embodiment of the invention, the system is one where the system (as described above in the first, second, third, fourth or fifth embodiments) is permanently installed as a part of a projection system or any other device mounted in a compatible location, such as a ceiling or a wall. Such configuration, as described in FIG. 9, can greatly increase ease of installation in locations that require both a data projector 3000 and a location tracking system 1030 and can reduce installation costs. The projection system position (mounted on the ceiling or high on a wall) provides a convenient placement for the location system to track the MDD 1020. Some processing functions can be performed on the projection system's data processor further reducing overall costs. System data signals can be channeled through the projection system and communicated together with the projection data to the MDDs or the server.

Figure 10:
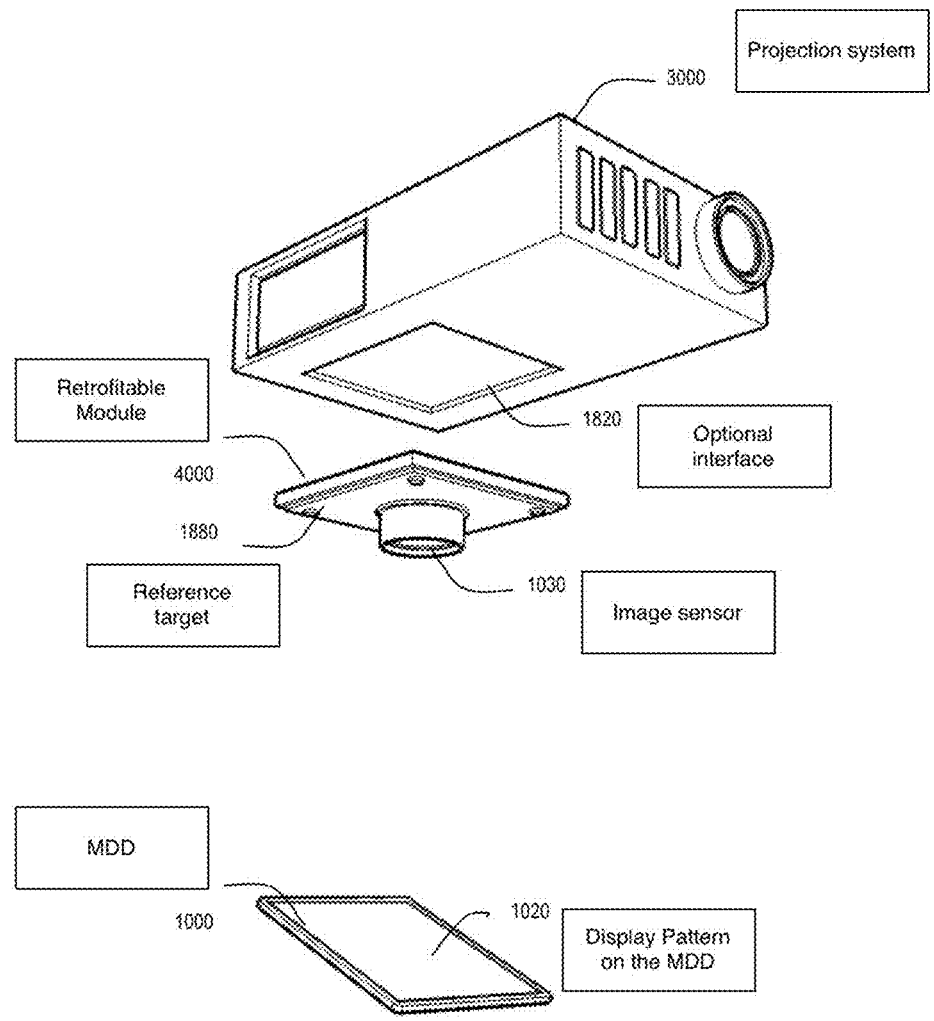
FIG. 10 is a perspective view of a possible embodiment of the retrofittable sensor unit for a projector.

In a further embodiment of the invention, the system, shown by example in FIG. 10, is one where the system (as described above in the first, second, third, fourth or fifth embodiments) can be retrofitted to a projection system or any other devices mounted in a compatible location such as a ceiling or a wall. Such configuration can greatly increase ease of installation in locations that require both a data projector 3000 and a location tracking system retrofittable module 4000 and can reduce installation costs. The projection system position (mounted on the ceiling or high on a wall) provides a convenient placement for the location system. The ability to retrofit the location system 4000 to the projection system 3000 makes this arrangement very flexible to both the manufacturer and the end-customer. The data processing functions can occur entirely on the retrofittable module 4000, or, with the addition of a hardware interface, some processing functions can be performed on the projection system's data processor, further reducing overall costs. System data signals can be channeled through the projection system and communicated together with the projection data to the MDDs or the server.

Figure 11:
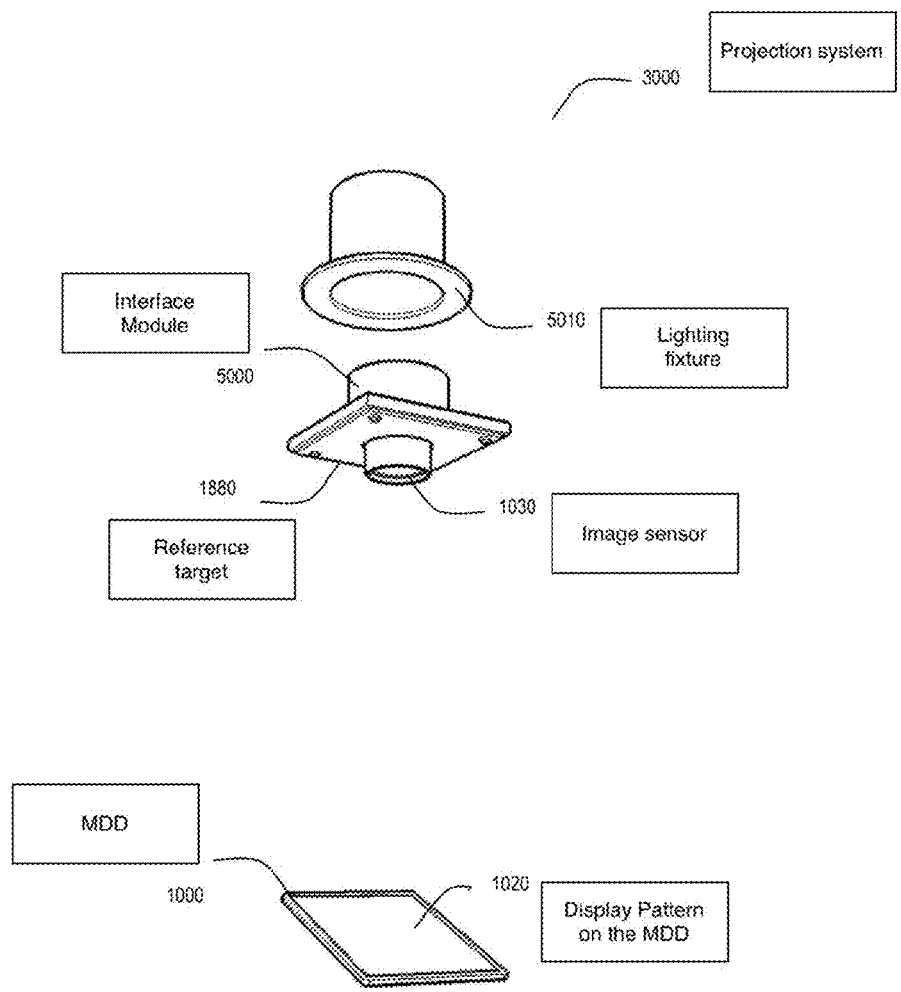
FIG. 11 is a perspective view of a possible embodiment of the retrofittable sensor unit for a light fixture.

In a further final embodiment of the invention, the system, shown by example in FIG. 11, is one where the system (as described above in the first, second, third, fourth or fifth above embodiments) is installed by fitting the interface module 5000 into any commercially available lighting fixture 5010. As used herein, the term "interface module" shall generally mean a mechanical and electrical part to connect the elements of the proposed system to a standard light fixture. Such configuration can greatly increase ease of installation in locations that are equipped with such light fixtures. The interface module 5000 can use the lighting fixture base to draw power and, in some cases, to transmit the data signals. This method provides quick, easy installation at a low cost and has significant advantages for any future maintenance or upgrades.

I claim:

1. A system for determining the location and orientation of powered mobile display devices (MDDs), comprising:
   a. a MDD configured with a powered display screen capable of displaying multiple patterns;
   b. at least one sensor that is positioned to capture an image such that the powered display screens of said MDD are included in the image and that transmits the captured image to a data-extraction software component of the system;
   c. a processor configured to execute:
      i. a data-extraction software component that computes the size and shape data of the display screen of said MDD in said captured image;
      ii. a triangulation software component that compares said screen size and shape data with screen size and shape information from a server and calculates the location and orientation of said MDD:
      iii. and a data transmission module that transmits said location and orientation information to said MDD or to a server.

2. The system of claim 1, wherein the MDD displays multiple patterns on its powered display in a manner that can be detected by the system sensor(s).

3. The system of claim 1, wherein the MDD-powered display shows an active pattern that changes over time and can be detected by the system sensor(s).

4. The system of claim 1, wherein the sensor(s) of the system are built into or retrofitted to a ceiling-mounted or wall-mounted equipment.

5. The system of claim 1, wherein the sensor(s) of the system is/are contained in a physical module that can connect into any commercially available powered lighting fixture and draw power from said fixture.

6. The system of claim 1, wherein each MDD-powered display can be made to display a pattern that is unique to that specific MDD in a manner that can be detected by the system sensor(s).

7. A system for determining the location and orientation of powered mobile display devices (MDDs) comprising:
   a. an MDD incorporating at least one sensor that captures an image of a reference target on a ceiling or walls;
   b. a processor in the MDD or in a server configured to execute:
      i. an image extraction software module that extracts from said image data the size and proportions of said reference target; and
      ii. a triangulation software module comparing the data extracted by the image extraction software module with the known data of said reference target and calculates the location and orientation of said MDD.

8. The system of claim 7, wherein the reference target is active and changes over time.

9. The system of claim 7, wherein the server stores information about the reference target to be used in calculating the distance and orientation of the reference target.

10. The system of claim 7, wherein the reference target resides on or is built into the physical hardware containing the sensor(s).

* * * * *